United States Patent
Wang et al.

(10) Patent No.: US 10,887,813 B2
(45) Date of Patent: Jan. 5, 2021

(54) USER EQUIPMENT, NETWORK NODE AND METHODS IN A WIRELESS COMMUNICATIONS NETWORK

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 72 days.

(21) Appl. No.: 16/235,332

(22) Filed: Dec. 28, 2018

(65) Prior Publication Data
US 2019/0150052 A1    May 16, 2019

Related U.S. Application Data

(63) Continuation of application No. PCT/SE2018/051094, filed on Oct. 26, 2018.
(Continued)

(51) Int. Cl.
*H04W 36/30* (2009.01)
*H04W 36/38* (2009.01)
(Continued)

(52) U.S. Cl.
CPC ......... *H04W 36/305* (2018.08); *H04W 36/08* (2013.01); *H04W 36/385* (2013.01);
(Continued)

(58) Field of Classification Search
CPC ........... H04W 36/305; H04W 72/0413; H04W 74/02; H04W 74/0833; H04W 72/0453;
(Continued)

(56) References Cited

U.S. PATENT DOCUMENTS

| | | | | | |
|---|---|---|---|---|---|
| 2010/0272017 | A1* | 10/2010 | Terry | .................... | H04W 48/12 370/328 |
| 2012/0213089 | A1* | 8/2012 | Shi | .......................... | H04L 5/001 370/241 |

(Continued)

FOREIGN PATENT DOCUMENTS

| EP | 3101986 A1 | 12/2016 |
|---|---|---|
| WO | 2012137034 A1 | 10/2012 |
| WO | 2018182385 A1 | 10/2018 |

OTHER PUBLICATIONS

Unknown, Author, "Baseline handover procedure for inter gNB handover in NR", Huawei, HiSilicon, 3GPP TSG-RAN WG2 Adhoc#2 on NR, R2-1706705, Qingdao, China, Jun. 27-29, 2017, 1-7.
(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

A method performed by a User Equipment (UE) for managing Uplink (UL) transmissions between the UE and a second network node in a wireless communications network is provided. The second network node serves a target cell comprising a first UL carrier and a second UL carrier. The UE receives a message from a first network node. The message relates to a handover of the UE to the target cell. The message comprises an indication indicating one or more UL carriers of the target cell. The UE then decides which one or more out of the first UL carrier and the second UL carrier that is corresponding to the indicated one or more UL carriers. The decided one or more UL carriers are for random access in the target cell.

24 Claims, 10 Drawing Sheets

Related U.S. Application Data

(60) Provisional application No. 62/586,196, filed on Nov. 15, 2017.

(51) Int. Cl.
| | |
|---|---|
| *H04W 36/08* | (2009.01) |
| *H04W 72/04* | (2009.01) |
| *H04W 88/02* | (2009.01) |
| *H04W 74/08* | (2009.01) |
| *H04W 74/02* | (2009.01) |

(52) U.S. Cl.
CPC ... *H04W 72/0413* (2013.01); *H04W 72/0453* (2013.01); *H04W 74/02* (2013.01); *H04W 74/0833* (2013.01); *H04W 88/023* (2013.01)

(58) Field of Classification Search
CPC .. H04W 36/08; H04W 36/385; H04W 88/023
See application file for complete search history.

(56) References Cited

U.S. PATENT DOCUMENTS

| | | | |
|---|---|---|---|
| 2013/0077485 A1* | 3/2013 | Bai | H04W 74/006 370/230 |
| 2018/0084550 A1* | 3/2018 | Chen | H04W 76/15 |
| 2018/0098223 A1* | 4/2018 | Hugl | H04W 72/1268 |

OTHER PUBLICATIONS

Unknown, Author, "Beam Related Measurement Report and Inter-cell HO in NR", CMCC, 3GPP TSG-RAN WG2 Meeting #97, R2-1701921, Athens, Greece, Feb. 13-17, 2017, 1-7.

Unknown, Author, "Further details of handover execution in NR", Ericsson, 3GPP TSG-RAN WG2 Meeting #97, R2-1700863, Athens, Greece, Feb. 13-17, 2017, 1-5.

Unknown, Author, "Remaining issues in RA CH Procedure", Huawei, HiSilicon, 3GPPTSG RAN WGI Meeting 90bis, R1-1717051, Prague, Czech Republic, Oct. 9-13, 2017, 1-11.

\* cited by examiner

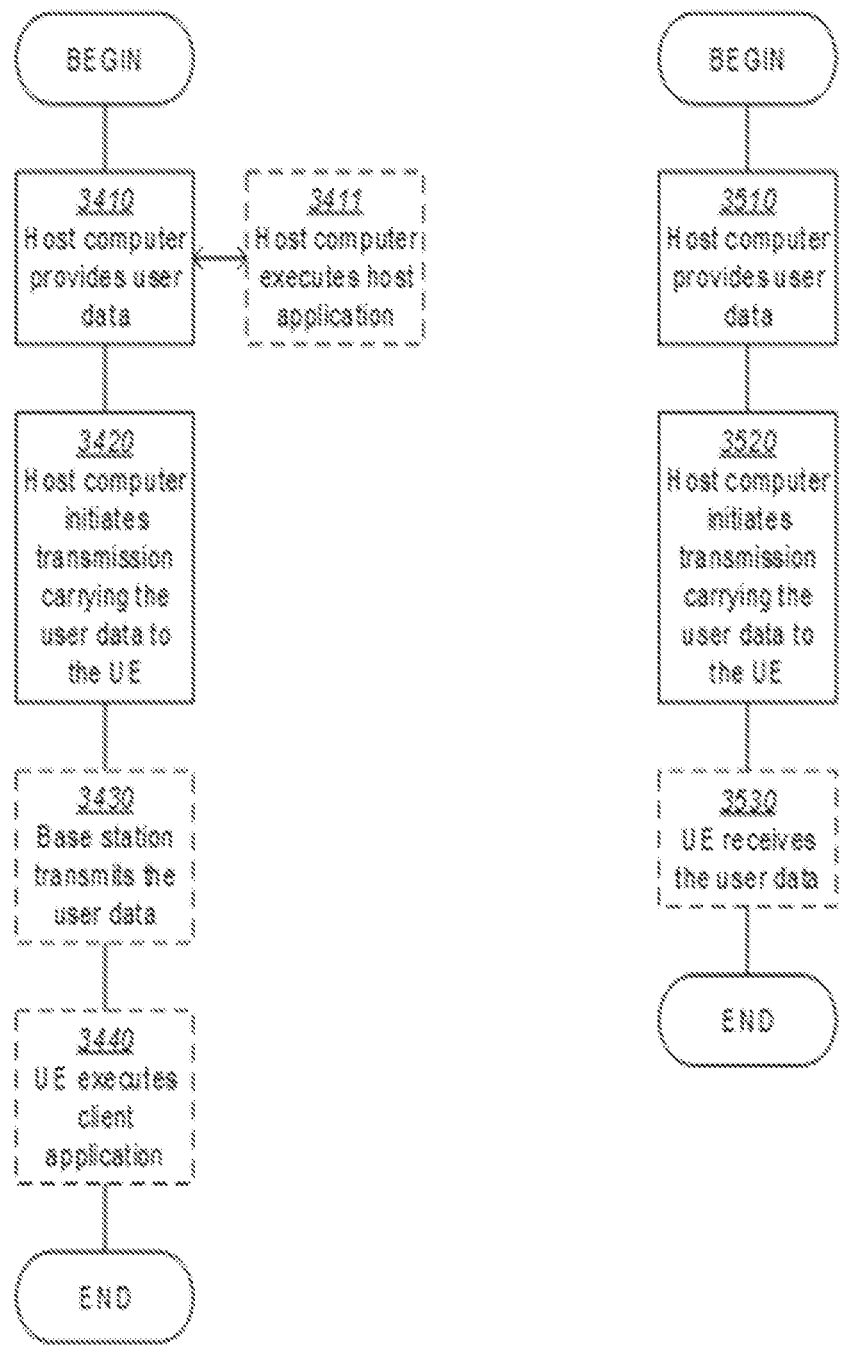

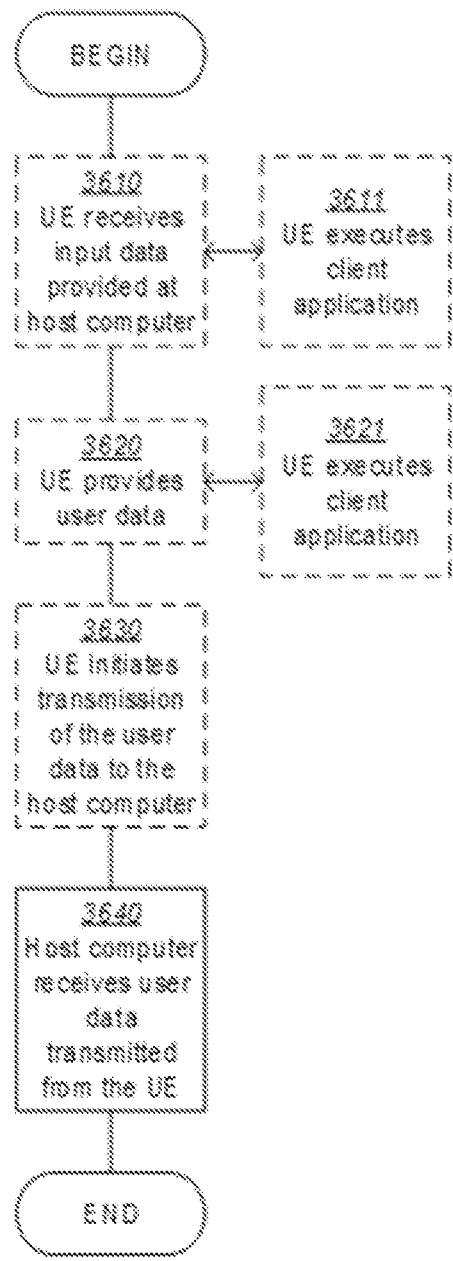
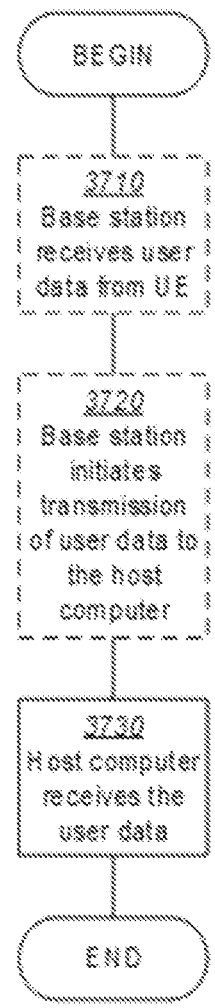
Fig. 11
Fig. 12

USER EQUIPMENT, NETWORK NODE AND METHODS IN A WIRELESS COMMUNICATIONS NETWORK

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

The LTE random access procedure comprises two forms, allowing the access to be either contention-based or contention-free.

A UE initiates a contention-based random access procedure. In this procedure, a random access preamble signature is randomly chosen by the UE, with the result that it is possible for more than one UE simultaneously to transmit the same signature, leading to a need for a subsequent contention resolution process.

For the use-cases of a UE in RRC_CONNECTED state, but not uplink-synchronized, needing to receive and a UE in RRC_CONNECTED state, handing over from its current serving cell to a target cell, the eNodeB has the option of preventing contention occurring by allocating a dedicated signature to a UE, resulting in contention-free access. This improves the success probability for the handover, since the UE doesn't need to contend the PRACH resources with other UEs that are initiating RACH accesses. Another benefit for contention-free access is that it is faster than contention-based access—a factor which is particularly important for the case of handover, which is time-critical.

Supplementary Uplink (SUL) Carriers

As the low carrier frequency bands were already deployed with 2G, 3G and 4G wireless communication systems, NR will be deployed at relatively higher frequencies. For wireless communication, the propagation loss will be roughly proportional to the square of the carrier frequency. Hence there may be coverage issue for wireless communication over high carrier frequencies. For downlink, the gNB may be equipped with powerful antenna systems and powerful amplifiers to boost the transmission power density, hence the DL coverage can be boosted. However, for UL, there are several restrictions such as transmit power, antenna size and cost. Hence there may be mismatch between UL and DL for a NR cell at high frequency.

For solving this, NR introduced a Supplementary Uplink (SUL) carrier for an NR cell, i.e. a NR cell has a SUL carrier plus a NR UL carrier. The SUL carrier is supposed to be a low frequency carrier which can be shared, e.g. in time and/or frequency domain, with other Radio Access Technology (RAT) system such as LTE. Introduction of SUL carriers is used to improve uplink coverage for an NR cell which is deployed at relative high frequency bands. The SUL carriers are deployed at the low frequency region, for example, at the LTE band. In this way, the uplink coverage of NR bands can be comparable with that in LTE. FIG. 1 shows the coverages of the NR UL carrier and the SUL carrier in a NR cell. FIG. 1 depicts NR frequency combination of paired carrier and SUL for UL only.

SUMMARY

As a part of developing embodiments herein a problem of the bitmap solution will first be identified and discussed.

Since there may be two Uplink (UL) carriers for an NR cell, the random access may be initiated in either the NR UL carrier or in the SUL carrier. It was agreed that a UE can select which carrier for random access based on a threshold. If the UE determine it is close to the network node, such as the gNB, based on the threshold, a UE shall select the NR UL carrier for random access due to the radio condition is good enough to finish the random access procedure over NR UL carrier. Otherwise, the UE shall select SUL carrier to finish the random access procedure. In such way the random access load can be offloaded between two UL carriers in a NR cell.

Some agreements concerning RACH access for SUL carriers have been made at RAN1 #90, and highlighted as below:

For NR UE initial access based on RACH configuration for an SUL carrier

RACH configuration for the SUL carrier is broadcasted in RMSI

The configuration information for the SUL carrier is sufficient for UEs to complete RACH procedure via only that SUL carrier In particular the configuration information includes all necessary power control parameters The configuration information for the SUL carrier includes a threshold. The UE selects that SUL carrier for initial access if and only if the RSRP measured by the UE on the DL carrier where the UE receives RMSI is lower than the threshold If the UE starts its RACH procedure on the SUL carrier, then the RACH procedure is completed with all uplink transmission taking place on that carrier It is expected that the network would be able to request a connected-mode UE to initiate a RACH procedure towards any uplink carrier for path-loss and timing-advance acquisition Sent an LS accommodating above agreement to RAN2

According to above agreements, the UE performs the initial access on an SUL carrier only when a Reference Signal Received Power (RSRP) measured on the DL carrier is lower than a given threshold, which means that the UE probably reaches the border of the uplink NR carrier coverage.

In NR, it was agreed that an idle UE can select an SUL carrier to perform initial access according a measured DL RSRP in a region where a Random Mobile Subscriber Identity (RMSI) is transmitted compared to a preconfigured threshold. How the UE performs a RACH access when the UE hands over to a new serving cell which comprises at least one SUL carrier for UL coverage extension and a NR UL carrier is not decided. However, the above mentioned agreements for idle UE do not apply for this case because the UE may not be able to read the RMSI/SIB 1 of the target cell. The UE would then have two options to perform the RACH access, either on an SUL carrier or a normal NR carrier. The criteria and the corresponding procedure are required to be defined to address these pending issues.

An object of embodiments herein is to improve the handover procedure in a wireless communications network According to an aspect the object is achieved by a method performed by a User Equipment (UE) for managing Uplink (UL) transmissions between the UE and a second network node in a wireless communications network. The second network node serves a target cell comprising a first UL carrier and a second UL carrier. The UE receives a message from a first network node. The message relates to a handover of the UE to the target cell. The message comprises an indication indicating one or more UL carriers of the target cell. The UE then decides which one or more out of the first UL carrier and the second UL carrier that is corresponding to the indicated one or more UL carriers. The decided one or more UL carriers are for random access in the target cell.

According to another aspect the object is achieved by a method performed by a first network node for managing Uplink (UL) transmissions between a UE and a second network node in a wireless communications network. The second network node serves a target cell comprising a first UL carrier and a second UL carrier, the method comprising:

The first network sends a message to the UE. The message relates to a handover of the UE to the target cell. The message comprises an indication indicating one or more UL carriers of the target cell to be used for random access in the target cell. The indicated one or more UL carriers correspond to one or more out of: the first UL carrier and the second UL carrier.

According to a further aspect the object is achieved by a User Equipment, UE for managing Uplink (UL) transmissions between the UE and a second network node in a wireless communications network. The second network node is adapted to serve a target cell comprising a first UL carrier and a second UL carrier. The UE is configured to:

Receive a message from a first network node, which message relates to a handover of the UE to the target cell, and which message is adapted to comprise an indication indicating one or more UL carriers of the target cell, and decide which one or more out of the first UL carrier and the second UL carrier that is corresponding to the indicated one or more UL carriers, which decided one or more UL carriers are adapted to be used for random access in the target cell.

According to a yet further aspect the object is achieved by a first network node for managing Uplink (UL) transmissions between a UE and a second network node in a wireless communications network. The second network node is adapted to serve a target cell comprising a first UL carrier and a second UL carrier. The first network node is configured to:

Send a message, to the UE, which message relates to a handover of the UE to the target cell, and which message is adapted to comprise an indication indicating one or more UL carriers of the target cell to be used for random access in the target cell. The indicated one or more UL carriers are adapted to correspond to one or more out of the first UL carrier and the second UL carrier.

An advantage of embodiments herein is that they provide efficient means or guidelines for the UE to perform a correct carrier selection in the target cell while receiving the handover command. That benefits the latency reduction for the data transfer. The signaling overload is also reduced due to avoidance of unnecessary carrier switches after the serving cell change.

BRIEF DESCRIPTION OF THE FIGURES

FIGS. 9-12 are flowcharts illustrating methods implemented in a communication system including a host computer, a base station and a user equipment.

DETAILED DESCRIPTION

A further object of embodiments herein is to improve the handover procedure when a selected target cell is a NR cell including an multiple UL carriers such as a first UL carrier e.g. an NR UL carrier and a second UL carrier, e.g. an SUL carrier.

According to some example embodiments herein, when a selected target cell is an NR cell including an NR carrier and an SUL carrier, the handover command and the procedure is further enhanced to take in account the UL carrier selection at initiating random access to set up radio connection with the target cell.

Embodiments herein provide methods in a wireless communications network comprising multiple carriers with improved performance such as in some embodiments, methods to Configure Handover to NR Cell with SUL carrier.

Some embodiments herein provide changes for RRC signaling messages to explicitly or implicitly indicate the carrier for the RACH access in the target cell, during a handover procedure.

Figure 1:
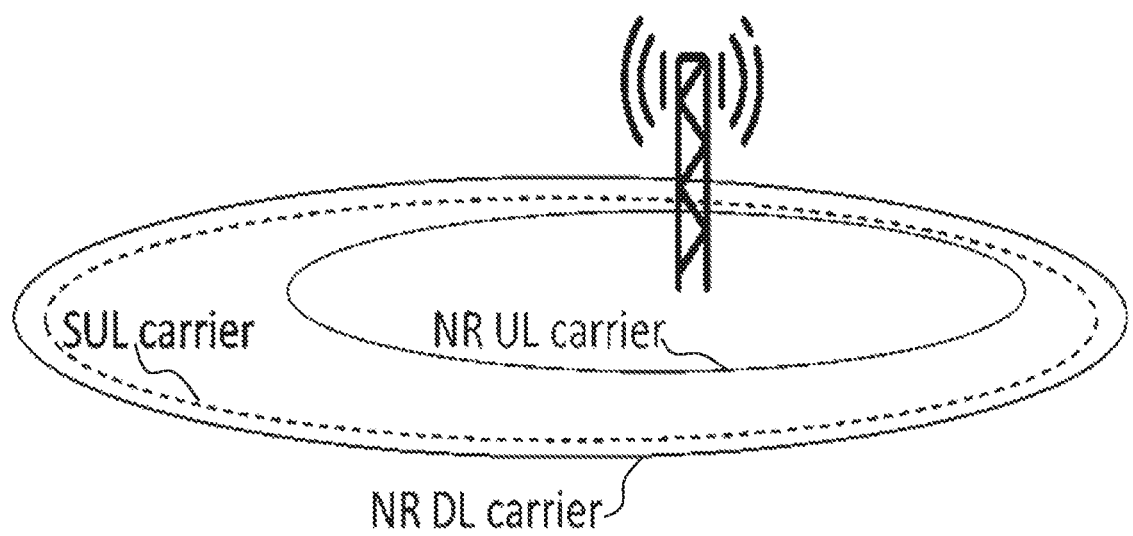
FIG. 1 is a schematic block diagram illustrating prior art.
Figure 2:
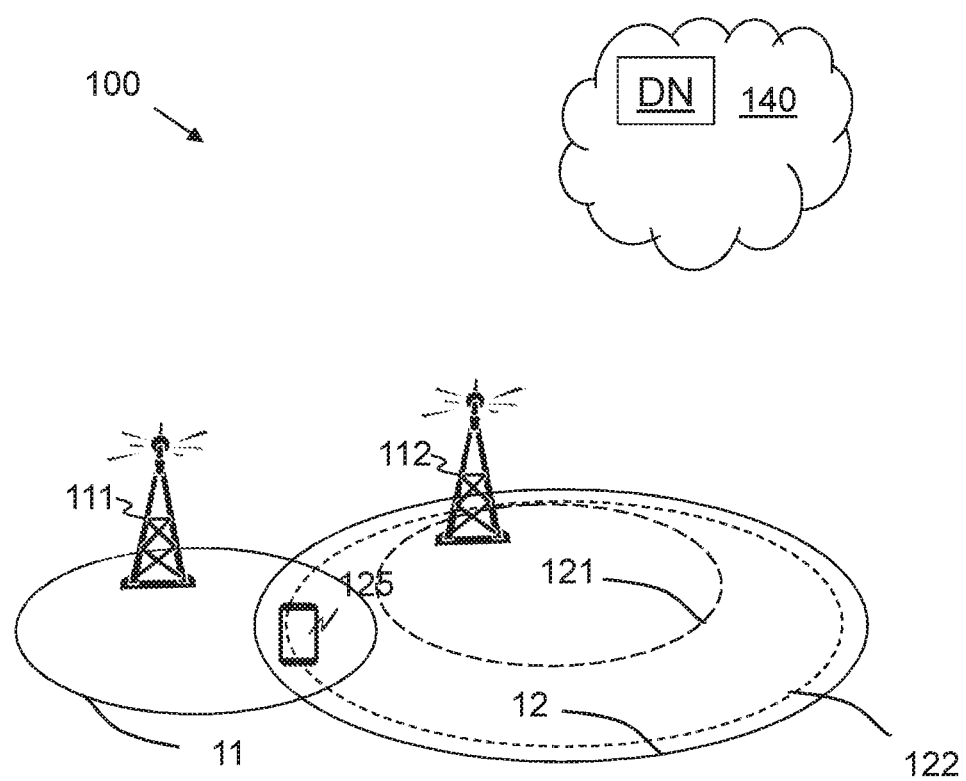
FIG. 2 is a schematic block diagram illustrating embodiments of a wireless communications network.

Embodiments herein relate to wireless communication networks in general. FIG. 2 is a schematic overview depicting a wireless communications network 100. The wireless communications network 100 comprises one or more RANs and one or more CNs. The wireless communications network 100 may use NR but may further use a number of other different technologies, such as, 5G, NB-IoT, CAT-M, Wi-Fi, eMTC, Long Term Evolution (LTE), LTE-Advanced Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a network node 111 also referred to as the first network node 111, providing radio coverage over a geographical area, a cell 11 and a network node 112 also referred to as the second network node 112, providing radio coverage over a geographical area, a cell 12. In some embodiments the network node 111 provides both the cells 11 and 12. The cells 11 and 12 may also be referred to as a service area, beam or a group of beams multiple TRPs, or multiple BWPs. The cell 12 is configured with multiple UL carries such as multiple beams, multiple TRPs, or multiple BWPs. Cell 12 may e.g. be an NR cell configured with both a SUL carrier and an NR UL carrier. The cell 12 comprises at least a first UL carrier 121 and a second UL carrier 122, wherein the first carrier may be an NR UL carrier and the second UL carrier may be a SUL carrier. The SUL carrier may be associated with the NR UL carrier, i.e., the NR UL carrier may be the carrier that the SUL carrier provides extended UL coverage towards. Cell 11 may be referred to as a source cell 11 and cell 12 may be referred to as a target cell 12.

The network nodes 111, 112 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with a UE within its provided cell 11, 12 depending e.g. on the radio access technology and terminology used. The network nodes 111 and 112 may communicate with a UE 125 with Downlink (DL) transmissions to the UE 125 and Uplink (UL) transmissions from the UE 125.

Wireless devices such as e.g. the UE 125 operate in the wireless communications network 100. The UE 125 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 111, one or more Access Networks (AN), e.g. RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

According to an example scenario the UE 125 being served in cell 11 moves towards a target cell 12 and therefore needs to perform a handover from the source cell 11 to the target cell 12. Wherein the target cell 12 comprises at least a first UL carrier 121 and a second UL carrier 122, wherein the first carrier may be an NR UL carrier and the second UL carrier may be a SUL carrier.

Methods according to embodiments herein may be performed by the network node 111. As an alternative, a Distributed Node DN and functionality, e.g. comprised in a cloud 140 as shown in FIG. 2 may be used for performing or partly performing the methods.

Figure 3:
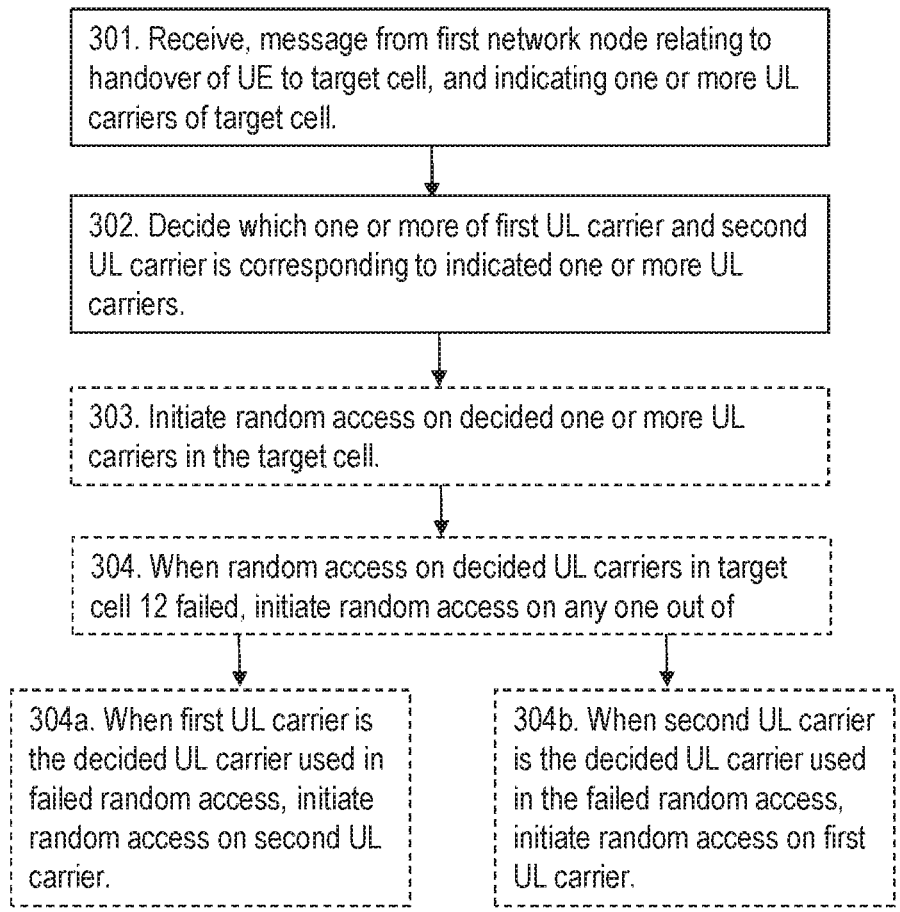
FIG. 3 is a flowchart depicting embodiments of a method in a user equipment.

Example embodiments of a method performed by the UE 125 e.g. for managing and/or handling Uplink (UL) Transmissions, such as e.g. random access transmissions, between the UE 125 and the second network node 112 in a wireless communications network 100, will now be described with reference to a flowchart depicted in FIG. 3. The second network node 112 serves the target cell 12 comprising a first UL carrier and a second UL carrier. In some embodiments the first carrier may be any NR UL carrier and the second UL carrier 112 may be a SUL carrier.

Some related first, second, third, fourth, fifth and sixth embodiments will be described later on in this document.

The method may comprise one or more of the following actions which actions may be taken in any suitable order.

In short, the method comprises one or more of the following actions:

In Action 301, the UE 125 receives a message, such as e.g. a Radio Resource Control, RRC, signalling message, from the first network node 111. The message relates to a handover of the UE 125 e.g. from the source cell 11 to the target cell 12. The message comprises an indication indicating one or more UL carriers of the target cell 12.

In Action 302, the UE 125 decides which one or more out of the first UL carrier and the second UL carrier that is corresponding to the indicated one or more UL carriers, which decided one or more UL carriers are for random access in the target cell 12.

In Action 303, the UE 125 may initiate random access on the decided one or more UL carriers in the target cell 12.

In Action 304, when the random access, such as the RACH access, on the decided one or more UL carriers in the target cell 12 has failed the UE 125 may initiate random access on any one out of:

When the first UL carrier is the decided one or more UL carriers used in the failed random access, initiating 304a random access on the second UL carrier, and when the second UL carrier is the decided one or more UL carriers used in the failed random access, initiating 304b random access on the first UL carrier.

In more detail, the method comprises one or more of the following actions: The actions will be yet further explained in paragraphs after the method actions.

Action 301

According to an example scenario, the UE 125 camps on the cell 11 provided by the first network node 111, and moves towards the edge of cell 11 on its way towards the cell 12 provided by the second network node 112. Therefore hand over from cell 11 to cell 12 will be needed. The UE 125 receives a message from the first network node 111. The message relates to a handover of the UE 125 to the target cell 12. The message comprises an indication indicating one or more UL carriers of the target cell 12. The message may e.g. be a Radio Resource Control, RRC, signalling message.

The indication may be indicated according to any one out of: explicitly and implicitly. In other words, the indication may be explicitly or implicitly indicated.

Action 302

According to an example scenario, the UE 125 will perform a random access in the target cell 12. However, the target cell 12 comprises two UL carriers, the first UL carrier and the second UL carrier. The indication in the message will assist the UE 125 in deciding whether to perform the random access on the first, the second or both UL carriers provided in the target cell 12. As mentioned above, the first carrier may be a NR UL carrier and the second UL carrier may be a SUL carrier.

Thus the UE 125 decides which one or more out of the first UL carrier and the second UL carrier that is corresponding to the indicated one or more UL carriers. The decided one or more UL carriers are for random access in the target cell 12. In other words, the UE 125 decides which one or more of the first UL carrier and the second UL carrier that is indicated in the message.

According to a first embodiment, the indication may indicate any one out of: a carrier index and a carrier type, of the one or more UL carriers in the target cell 12. That is, the indication may indicate a carrier index or a carrier type of the one or more UL carriers in the target cell 12.

According to a second embodiment, the indication may comprise one or two random access configurations which are applicable to both the first UL carrier and the second UL carrier. The message may further comprise an indication of a rule of when to use the random access configuration for the first UL carrier and when to use the random access configuration for the second UL carrier.

Action 303

The UE 125 then initiates the random access on the decided one or more UL carriers in the target cell 12. The random access may e.g. be as the RACH access.

Action 304

The initiated random access may fail, e.g. to meet a predefined requirement. This may be the case if e.g., the UE 125 does not receive any RACH response within a given time period, or the number of RACH access attempts with the same preamble reach a maximum limitation, or the number of used preambles are above a maximum limitation.

Thus, when the random access on the decided one or more UL carriers in the target cell 12 has failed, the UE 125 initiates random access on any one out of:

When the first UL carrier is the decided one or more UL carriers used in the failed random access, initiating 304*a* random access on the second UL carrier, and when the second UL carrier is the decided one or more UL carriers used in the failed random access, initiating 304*b* random access on the first UL carrier.

In other words, the UE 125 initiates 304*a* random access on the second UL carrier when the first UL carrier is the decided one or more UL carriers used in the failed random access, or initiates 304*b* random access on the first UL carrier, when the second UL carrier is the decided one or more UL carriers used in the failed random access.

Figure 4:
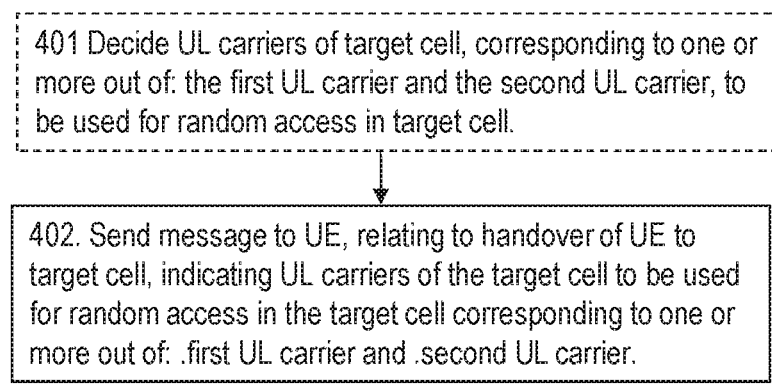
FIG. 4 is a flowchart depicting embodiments of a method in a network node.

Example embodiments of a method performed by a first network node 111 e.g. for managing and/or handling Uplink (UL) Transmissions, such as e.g. random access transmissions, between a UE 125 and a second network node 112 in a wireless communications network 100, will now be described with reference to a flowchart depicted in FIG. 4. The second network node 112 serves a target cell 12 comprising a first UL carrier and a second UL carrier, and e.g. the first network node 111 serves the UE 125 in a source cell 11. In some embodiments the first carrier may be any NR UL carrier and the second UL carrier 112 may be a SUL carrier.

Some related first, second, third, fourth, fifth and sixth embodiments will be described later on in this document.

The method may comprise one or more of the following actions which actions may be taken in any suitable order.

In short, the method comprises one or more of the following actions:

In Action 401, the network node 111 may e.g. obtain such as decide one or more UL carriers of the target cell 12 to be used for random access in the target cell 12. The one or more UL carriers correspond to one or more out of: the first UL carrier and the second UL carrier.

In Action 402, the network node 111 sends a message, such as e.g. a Radio Resource Control, RRC, signalling message, to the UE 125, which message relates to a handover of the UE 125 to the target cell 12, and which message comprises an indication indicating e.g. the decided one or more UL carriers of the target cell 12 to be used for random access in the target cell 12 e.g. such as obtained or decided. The indicated one or more UL carriers correspond to one or more out of: the first UL carrier and the second UL carrier.

In more detail, the method comprises one or more of the following actions: The actions will be yet further explained in paragraphs after the method actions.

Action 401

The network node 111 may e.g. obtain, such as decide one or more UL carriers of the target cell 12 to be used for random access in the target cell 12. The one or more UL carriers correspond to one or more out of: the first UL carrier and the second UL carrier.

This may e.g. be performed by the first network node 111 or the second network node 112 or both, via information exchange between the two network nodes on e.g. the radio channel quality measurements of carriers, service Quality of Service (QoS) requirements, the latency budget for the handover procedure etc. In one example, the network node of the source cell 11, such as the first network node 111, asks for the information from the network node of the target cell 12 e.g. the second network node 112, the source node makes decision on the carrier switch. In another example, the second network node 112 makes decision on the carrier switch, and sends indicator on the selected carrier to the first network node 111. In yet another node, one of the nodes makes a choice on the UL carrier selection, another node may override the decision.

Action 402

The network node 111 will indicate to the UE 125 which UL carrier to use for the random access to the target network node 112. The network node 111 sends a message to the UE 125. The message relates to a handover of the UE 125 to the target cell 12. The message may e.g. be a Resource Control (RRC) signalling message. The message comprises an indication indicating one or more UL carriers of the target cell 12 to be used for random access in the target cell 12, e.g. the decided one or more UL carriers of the target cell 12 to be used for random access in the target cell 12. The indicated one or more UL carriers correspond to one or more out of: the first UL carrier and the second UL carrier. In other words, the indicated one or more UL carriers correspond to one or more out of: the first UL carrier and the second UL carrier.

The indication may be indicated according to any one out of: explicitly and implicitly. That is, the indication may be indicated explicitly or implicitly.

According to a first embodiment, the indication may indicate any one out of: a carrier index and a carrier type, of the one or more UL carriers in the target cell 12. That is, the indication may indicate a carrier index or a carrier type of the one or more UL carriers in the target cell 12.

According to a second embodiment, the indication may comprise one or two random access configurations which are applicable to both the first UL carrier and the second UL carrier. The message may further comprise an indication of a rule of when to use the random access configuration for the first UL carrier and when to use the random access configuration for the second UL carrier.

Embodiments herein such as e.g. the first, second, third, fourth, fifth and sixth embodiments as mentioned above, will now be further described and exemplified. The text below is applicable to and may be combined with any suitable embodiment described above. In the embodiments below an NR UL carrier is used as an example of the first UL carrier 111 and a SUL carrier is used as an example of the second UL carrier 112. However, the examples below may also be applicable to any UL carriers belonging to the same cell. Further a handover command is used as an example of the message.

First Embodiments

In the first embodiments, the indication is represented by a carrier index and/or a carrier type which may be any one out of explicitly and implicitly indicated. The indication may e.g. be included in the message, which e.g. may be a handover command, e.g., a RRC connection reconfiguration message. The UE 125 may select, also referred to as decide the UL carrier for random access accordingly in the target cell 12. There may be several examples on how to signal the carrier index to the UE 125. A first example is intended to elaborate on how to add the information, comprising the indication for contention free Random Access (RA), while a second example is intended to elaborate on how to add the information comprising the indication for contention based RA. The third example further explains on how to implicitly signal the information comprising the indication on the carrier.

In the first example, the handover command may explicitly carry the indication, here as an index or a type of UL carrier for contention free RA. So, a new field on the carrier indicator may be added in the RRC IE which is used to signal the dedicated Physical Random Access Channel (PRACH) configuration, such as RACH-ConfigDedicated IE in LTE spec. A UE performs a contention free random access on the indicated UL carrier upon reception of a HO command.

```
RACH-ConfigDedicated ::=    SEQUENCE {
    ra-PreambleIndex        INTEGER (0..63),
    ra-PRACH-MaskIndex      INTEGER (0..15)
    ra-Ul-carrier-type      ENUMERATED {SUL,
                            NR-UL-Carrier}
```

In the second example, the message is a handover command which explicitly carries the indication, here as an index or a type on the UL carrier for contention based RA. The carrier index may not be present in the RRC Information Element (IE) which is used to signal the dedicated PRACH configuration, such as RACH-ConfigDedicated IE in LTE spec. Instead, the indication such as the carrier index may be added to the IE intended for contention based RA, such as rach-ConfigCommon IE in LTE spec.

In the third example, no explicit indication such as carrier index and/or type is added in the message such as the handover command, instead, an implicit indication is used, the PRACH resources, in the frequency domain and time domain, are split between the SUL carrier and the NR UL carrier for RACH access during a handover procedure. In this way, some preambles are assigned for the SUL carrier, while the others are assigned for the NR UL carrier. Similarly, RACH transmission opportunities in the time domain in the target cell 12 may be split between the SUL carrier and the NR UL carrier. Some positions in the time domain are reserved for the SUL carrier, while the rest positions are used for the NR UL carrier which is used for the implicit indication. Upon reception of the assigned PRACH resource, the UE 125 figures out, e.g. decides, which carrier should be used for RACH access in the target cell.

Second Embodiments

In the second embodiments, the indication in the handover command comprises only one configuration such as e.g. one RACH/PRACH configuration, for the target cell 12, which means that the UE 125 may use this configuration to initiate a RACH access on both the SUL carrier and the NR UL carrier. Additionally, the handover command may also comprise an indication of a rule such as a DL radio channel quality threshold, such as RSRP/Reference Signal Received Quality (RSRQ) threshold, for the RACH access. If the measured DL channel quality is below that threshold, the UE 125 may use the SUL carrier for RACH access, otherwise, the UE 125 may use the NR UL carrier. As another option, the handover command doesn't carry a threshold for the DL radio channel quality. The handover command just comprises an indication of a rule comprising a priority order between RACH access on the SUL carrier and the NR UL carrier. Then, the UE 125 may follow the priority order to initiate RACH accesses on both carriers separately. The RACH accesses on the second UL carrier may be initiated until the ones on the first UL carrier has failed and the other way around, the RACH accesses on the first UL carrier may be initiated until the ones on the second UL carrier has failed.

Third Embodiments

In the third embodiments, the indication in the handover command may comprises two separate RACH/PRACH configurations for the target cell 12, where one PRACH configuration is associated with the SUL carrier, while another one is associated with the NR UL carrier. The UE 125 may then perform the RACH access on one carrier which is either the SUL carrier or the NR UL carrier, first. If the RACH access on the first UL carrier fails, then the UE 125 initiates the RACH access on the second UL carrier. The network such as the network node 111 may define a priority order between two UL carriers for RACH accesses, for the UE 125. In this embodiment, the UE 125 does not need to wait for RACH accesses have failed on the first UL carrier, in order to start RACH accesses on the second UL carrier.

Fourth Embodiments

In the fourth embodiments, the indication in the handover command may comprise information to instruct the UE 125 to initiate two RACH accesses for the same purpose, i.e., to access the target cell 12, where one RACH access is initiated on the SUL carrier, and one RACH access on the NR UL carrier. The two RACH access requests may be initiated at the same time, or at two different time instants, with the same or different preambles. In this way, the gNB such as e.g. the second network node 112 may be able to identify at least one RACH access request among two requests.

Fifth Embodiments

In the fifth embodiments, the network such as the first network node 111 may define a response window for the handover command after the transmission of a handover measurement message. Within this response window, the network such as the first network node 111 may send multiple handover command messages to the UE 125. in this case, one handover command indicates such as corresponds to a specific carrier, either the SUL carrier or the NR UL carrier. Upon reception of a handover command, the UE 125 performs the RACH access on the indicated such as corresponding carrier. The mapping between a handover command message and an UL carrier is defined by the network such as the first network node 111. The network such as the first network node 111 sends a second handover command when it is indicated that the UE 125 is not able to succeed the RACH access upon reception of the first handover command.

Sixth Embodiments

In the sixth embodiments, when a measurement report to trigger handover is transmitted to the UE 125, the UE 125 may read the system information which in these embodiments comprises the indication, on at least the neighboring DL carriers whose measurements are included in the measurement report. The indication comprised the system information, e.g. SIB1, may comprise criteria and/or configuration for the handover UE 125, on when to use an SUL carrier and when to use the NR UL carrier to perform a RACH access. For example, the UE 125 uses the SUL carrier if the downlink measurement on that cell 12 is below a given threshold, otherwise, use the NR UL carrier. In this way, upon reception of a handover command from the first network node 111 providing the serving cell 11, the UE 125 decides which cell is the target serving cell 12, and further decides to use the SUL carrier or the NR UL carrier for a RACH access, in that target cell 12, based on if the DL RSRP on that target cell fulfills the rule, such as e.g. the given criteria.

Figure 5:
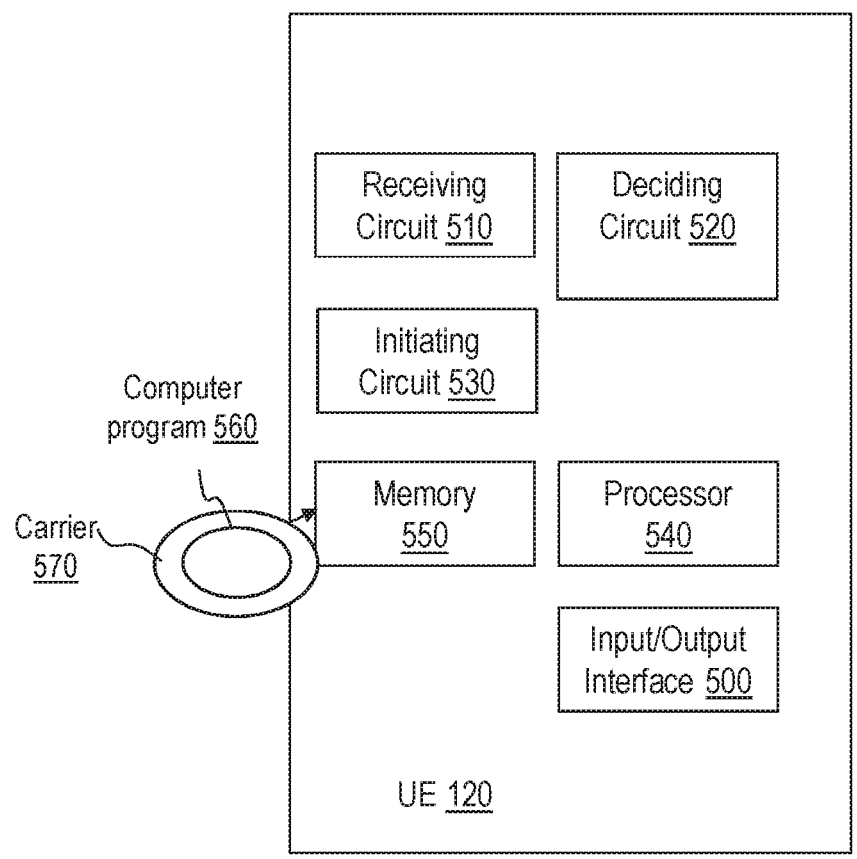
FIG. 5 is a schematic block diagram illustrating embodiments of a user equipment.

To perform the method actions e.g. for managing and/or handling UL transmissions, such as e.g. random access transmissions, between the UE 125 and the second network node 112 in the wireless communications network 100, the UE 125 may comprise the arrangement depicted in FIG. 5. The UE 125 may e.g. comprise a receiving circuit 510, a deciding circuit 520 and an Initiating circuit 530.

To perform the method actions e.g. for managing and/or handling UL transmissions, such as e.g. random access transmissions, between the UE 125 and the second network node 112 in the wireless communications network 100, the UE 125 may in some embodiments e.g. comprise a receiving module 510, an receiving module 520 and a Initiating module 530. Those skilled in the art will also appreciate that the modules and circuits in the UE 125 described above may refer to a combination of analog and digital circuits, and/or one or more processors configured with software and/or firmware, e.g. stored in the UE 125, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The UE 125 may comprise an Input and output Interface 500 configured to communicate e.g. with the network node 111. The input and output interface may comprise a wireless receiver (not shown) and a wireless transmitter not (shown).

The UE 125 being configured to e.g. by means of the receiving circuit 510 or receiving module 510 in the UE 125 receive a message from a first network node 110. The message relates to a handover of the UE 125 to the target cell 12. The message is adapted to comprise an indication indicating one or more UL carriers of the target cell 12.

The UE 125 is further configured to e.g. by means of the deciding circuit 520 or deciding module 520 in the UE 125, decide which one or more out of the first UL carrier and the second UL carrier that is corresponding to the indicated one or more UL carriers. The decided one or more UL carriers are adapted to be used for random access in the target cell 12.

In some embodiments, the UE 125 may further being configured to e.g. by means of the initiating circuit 530 or initiating module 530 in the UE 125, initiate random access on the decided one or more UL carriers in the target cell 12.

In these embodiments, the UE 125 may further being configured to e.g. by means of the initiating circuit 530 or initiating module 530 in the UE 125, when the random access, on the decided one or more UL carriers in the target cell 12 has failed, initiate random access on any one out of:

When the first UL carrier is the decided one or more UL carriers used in the failed random access, initiate random access on the second UL carrier, and when the second UL carrier is the decided one or more UL carriers used in the failed random access, initiate random access on the first UL carrier.

The embodiments herein may be implemented through a respective processor or one or more processors, such as a processor 540 of a processing circuitry in the UE 125 depicted in FIG. 5, together with respective computer program code for performing the functions and actions of the embodiments herein. The program code mentioned above may also be provided as a computer program product, for instance in the form of a data carrier carrying computer program code for performing the embodiments herein when being loaded into the UE 125. One such carrier may be in the form of a CD ROM disc. It is however feasible with other data carriers such as a memory stick. The computer program code may furthermore be provided as pure program code on a server and downloaded to the UE 125.

The UE 125 may further comprise a memory 550 comprising one or more memory units. The memory comprises instructions executable by the processor in. The memory is arranged to be used to store e.g. data, configurations, indications, and applications to perform the methods herein when being executed in the UE 125.

In some embodiments, a respective computer program 560 comprises instructions, which when executed by the respective at least one processor, cause the at least one processor of the UE 125 to perform the actions above.

In some embodiments, a respective carrier 570 comprises the respective computer program, wherein the carrier is one of an electronic signal, an optical signal, an electromagnetic signal, a magnetic signal, an electric signal, a radio signal, a microwave signal, or a computer-readable storage medium.

Figure 6:
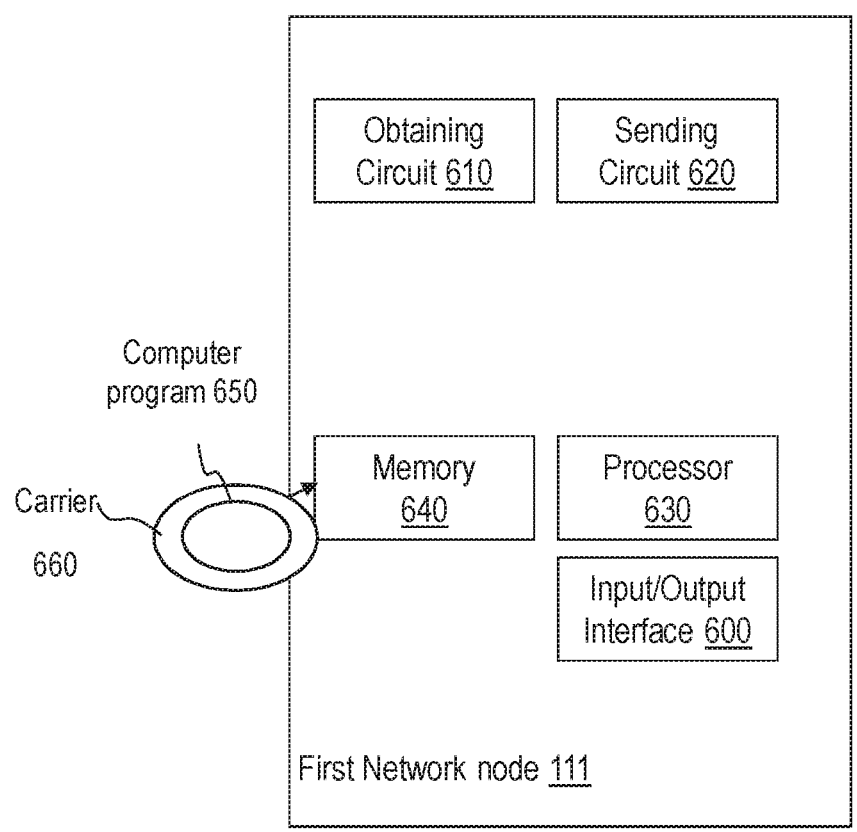
FIG. 6 is a schematic block diagram illustrating embodiments of a network node.

To perform the method actions e.g. for managing and/or handling UL transmissions, such as e.g. random access transmissions, between the UE 125 and the second network node 112 in the wireless communications network 100, the first network node 111 may comprise the arrangement depicted in FIG. 6. The network node 111 may e.g. comprise an obtaining circuit 610 and a sending circuit 620.

To perform the method actions e.g. f To perform the method actions e.g. for managing and/or handling UL transmissions, such as e.g. random access transmissions, between the UE 125 and the second network node 112 in the wireless communications network 100, the first network node 111 may in some embodiments e.g. comprise a obtaining module 610, and a sending module 620.

Those skilled in the art will also appreciate that the modules and circuits in the first network node 111 described above may refer to a combination of analog and digital circuits, and/or one or more processors configured with software and/or firmware, e.g. stored in the first network node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The network node 111 may comprise an Input and output Interface 600 configured to communicate e.g. with the UE 125. The input and output interface may comprise a wireless receiver (not shown) and a wireless transmitter not (shown).

The first network node 111 may further be configured to e.g. by means of an obtaining circuit 610 or obtaining module 610 in the first network node 111, to e.g. obtain such as decide, one or more UL carriers of the target cell 12 to be used for random access in the target cell 12, which one or more UL carriers corresponds to one or more out of: the first UL carrier and the second UL carrier.

The first network node 111 is configured to e.g. by means of the sending circuit 620 or sending module 620 in the first network node 111, to send a message to the UE 125. The message relates to a handover of the UE 125 to the target cell 12. The message is adapted to comprise an indication indicating one or more UL carriers of the target cell 12 to be used for random access in the target cell 12. The indicated one or more UL carriers are adapted to correspond to one or more out of: the first UL carrier and the second UL carrier.

The embodiments herein may be implemented through a respective processor or one or more processors, such as the processor 630 of a processing circuitry in the first network node 111 depicted in FIG. 6, together with respective computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 640 comprising one or more memory units. The memory comprises instructions executable by the processor in first network node 111. The memory is arranged to be used to store e.g. data, configurations, indications, and applications to perform the methods herein when being executed in the network node 111.

In some embodiments, a respective computer program 650 comprises instructions, which when executed by the respective at least one processor, cause the at least one processor of the first network node 111 to perform the actions above.

In some embodiments, a respective carrier 660 comprises the respective computer program, wherein the carrier is one of an electronic signal, an optical signal, an electromagnetic signal, a magnetic signal, an electric signal, a radio signal, a microwave signal, or a computer-readable storage medium.

Some example Embodiments numbered 1-44 are described below.

The following embodiments refer to FIG. 2-6.

1. Embodiment 1. A method performed by a User Equipment (UE) 125 e.g. for managing and/or handling Uplink (UL) Transmissions, such as e.g. random access transmissions, between the UE 125 and a second network node 112 in a wireless communications network 100, wherein the second network node 112 serves a target cell 12 comprising a first UL carrier and a second UL carrier, the method comprising:

receiving, 301 a message, such as e.g. a Radio Resource Control, RRC, signalling message, from a first network node 111, which message relates to a handover of the UE 125 to the target cell 12, and which message comprises an indication indicating one or more UL carriers of the target cell 12, deciding 302 which one or more out of the first UL carrier and the second UL carrier that is corresponding to the indicated one or more UL carriers, which decided one or more UL carriers are for random access in the target cell 12.

2. The method according to Embodiment 1, wherein the indication is indicated according to any one out of: explicitly and implicitly.

3. The method according to any of the Embodiments 1-2, wherein the first carrier is a New Radio (NR) UL carrier and wherein the second UL carrier is a Supplementary UL (SUL) carrier.

4. The method according to any of the Embodiments 1-3, such as e.g. the first embodiments wherein the indication indicates any one out of: a carrier index and a carrier type, of the one or more UL carriers in the target cell 12.

5. The method according to any of the Embodiments 1-3, such as e.g. the second embodiments wherein the indication comprises one random access configuration which is applicable to both the first UL carrier and the second UL carrier, and wherein the message further comprises an indication of a rule of when to use the random access configuration for the first UL carrier and when to use the random access configuration for the second UL carrier.

6. The method according to any of the Embodiments 1-3, such as e.g. the third embodiments wherein the indication comprises two separate random access configurations whereof a first random access configuration is applicable to the first UL carrier and a second random access configuration is applicable to the second UL carrier, and wherein the message further comprises an indication of a rule, such as e.g. a priority order, or a threshold, of when to use the first random access configuration for the at least one first UL carrier and when to use the second random access configuration for the second UL carrier.

7. The method according to any of the Embodiments 1-3, such as e.g. the fourth embodiments wherein the indication comprises an instruction the UE 125 to initiate two random accesses such as e.g. two RACH accesses, to access the target cell 12, whereof one random access such as e.g. one RACH access, on the first UL carrier, and one random access such as e.g. one RACH access, on the second UL carrier.

8. The method according to any of the Embodiments 1-3, such as e.g. the fifth embodiments wherein the message is a handover command, and wherein the indication comprises that the handover command corresponds to one or more out of the first UL carrier and the second UL carrier.

9. The method according to any of the Embodiments 1-3, such as e.g. the sixth embodiments wherein the indication is comprised in system information of said message.

10. The method according to any of the Embodiments 1-9, further comprising
initiating 303 random access on the decided one or more UL carriers in the target cell 12.

11. The method according to Embodiment 10, further comprising when the random access, such as the RACH access, on the decided one or more UL carriers in the target cell 12 has failed e.g. to meet a predefined requirement e.g., UE doesn't receive any RACH response within a given time period, or the number of RACH access attempts with the same preamble reach a maximum limitation, or the number of used preambles are above a maximum limitation initiating 304 random access on any one out of:
when the first UL carrier is the decided one or more UL carriers used in the failed random access, initiating 304 random access on the second UL carrier, and
when the second UL carrier is the decided one or more UL carriers used in the failed random access, initiating 304 random access on the first UL carrier.

12. A computer program comprising instructions, which when executed by a processor, causes the processor to perform actions according to any of the Embodiments 1-9.

13. A carrier comprising the computer program of Embodiment 10, wherein the carrier is one of an electronic signal, an optical signal, an electromagnetic signal, a magnetic signal, an electric signal, a radio signal, a microwave signal, or a computer-readable storage medium.

14. A method performed by a first network node 111 e.g. for managing and/or handling Uplink (UL) Transmissions, such as e.g. random access transmissions, between a UE 125 and a second network node 112 in a wireless communications network 100, wherein the second network node 112 serves a target cell 12 comprising a first UL carrier and a second UL carrier, and e.g. wherein the first network node 111 serves the UE 125 in a source cell 11 the method comprising:
e.g. obtaining such as deciding 401 one or more UL carriers of the target cell 12 to be used for random access in the target cell 12, which one or more UL carriers corresponds to one or more out of: the first UL carrier and the second UL carrier, and sending, 402 a message, such as e.g. a Radio Resource Control, RRC, signalling message, to the UE 125, which message relates to a handover of the UE 125 to the target cell 12, and which message comprises an indication indicating one or more UL carriers of the target cell 12 to be used for random access in the target cell 12, e.g. such as obtained or decided, wherein the indicated one or more UL carriers corresponds to one or more out of: the first UL carrier and the second UL carrier.

15. The method according to Embodiment 14, wherein the indication is indicated according to any one out of: explicitly and implicitly.

16. The method according to any of the Embodiments 14-15, wherein the first carrier is a New Radio (NR) UL carrier and wherein the second UL carrier is a Supplementary UL (SUL) carrier.

17. The method according to any of the Embodiments 14-16, such as e.g. the first embodiments wherein the indication indicates any one out of: a carrier index and a carrier type, of the one or more UL carriers in the target cell 12.

18. The method according to any of the Embodiments 14-16, such as e.g. the second embodiments wherein the indication comprises one random access configuration which is applicable to both the first UL carrier and the second UL carrier, and wherein the message further comprises an indication of a rule of when to use the random access configuration for the first UL carrier and when to use the random access configuration for the second UL carrier.

19. The method according to any of the Embodiments 14-16, such as e.g. the third embodiments
wherein the indication comprises two separate random access configurations whereof a first random access configuration is applicable to the first UL carrier and a second random access configuration is applicable to the second UL carrier, and wherein the message further comprises an indication of a rule, such as e.g. a priority order, or a threshold, of when to use the first random access configuration for the at least one first UL carrier and when to use the second random access configuration for the second UL carrier.

20. The method according to any of the Embodiments 14-16, such as e.g. the fourth embodiments wherein the indication comprises an instruction the UE 125 to initiate two random accesses such as e.g. two RACH accesses, to access the target cell 12, whereof one random access such as e.g. one RACH access, on the first UL carrier, and one random access such as e.g. one RACH access, on the second UL carrier.

21. The method according to any of the Embodiments 14-16, such as e.g. the fifth embodiments wherein the message is a handover command, and wherein the indication comprises that the handover command corresponds to one or more out of the first UL carrier and the second UL carrier.

22. The method according to any of the Embodiments 14-16, such as e.g. the sixth embodiments wherein the indication is comprised in system information of said message.

23. A computer program comprising instructions, which when executed by a processor, causes the processor to perform actions according to any of the Embodiments 14-24.

24. A carrier comprising the computer program of Embodiment 25, wherein the carrier is one of an electronic signal, an optical signal, an electromagnetic signal, a magnetic signal, an electric signal, a radio signal, a microwave signal, or a computer-readable storage medium.

25. Embodiment 25. A User Equipment (UE) 125 e.g. for managing Uplink (UL) Transmissions, between the UE 125 and a second network node 112 in a wireless communications network 100, wherein the second network node 112 is adapted to serve a target cell 12 comprising a first UL carrier and a second UL carrier, the UE 125 being configured to:

receive a message from a first network node 111, which message relates to a handover of the UE 125 to the target cell 12, and which message is adapted to comprise an indication indicating one or more UL carriers of the target cell 12, decide which one or more out of the first UL carrier and the second UL carrier that is corresponding to the indicated one or more UL carriers, which decided one or more UL carriers are adapted to be used for random access in the target cell 12.

26. The UE 125 according to Embodiment 25, wherein the indication is adapted to be indicated according to any one out of: explicitly and implicitly.

27. The UE 125 according to any of the Embodiments 25-26, wherein the first carrier is adapted to be a New Radio (NR) UL carrier and wherein the second UL carrier is adapted to be a Supplementary UL (SUL) carrier.

28. The UE 125 according to any of the Embodiments 25-27, such as e.g. the first embodiments wherein the indication adapted to indicate any one out of: a carrier index and a carrier type, of the one or more UL carriers in the target cell 12.

29. The UE 125 according to any of the Embodiments 25-27, such as e.g. the second embodiments wherein the indication adapted to comprise one random access configuration which is applicable to both the first UL carrier and the second UL carrier, and wherein the message adapted to further comprise an indication of a rule of when to use the random access configuration for the first UL carrier and when to use the random access configuration for the second UL carrier.

30. The UE 125 according to any of the Embodiments 25-27, such as e.g. the third embodiments wherein the indication is adapted to comprise two separate random access configurations whereof a first random access configuration is adapted to be applicable to the first UL carrier and a second random access configuration is adapted to be applicable to the second UL carrier, and wherein the message further adapted to comprise an indication of a rule, of when to use the first random access configuration for the at least one first UL carrier and when to use the second random access configuration for the second UL carrier.

31. The UE 125 according to any of the Embodiments 25-27, such as e.g. the fourth embodiments wherein the indication adapted to comprise an instruction the UE 125 to initiate two random accesses to access the target cell 12, whereof one random access on the first UL carrier, and one random access on the second UL carrier.

32. The UE 125 according to any of the Embodiments 25-27, such as e.g. the fifth embodiments wherein the message is adapted to be a handover command, and wherein the indication adapted to comprise that the handover command corresponds to one or more out of the first UL carrier and the second UL carrier.

33. The UE 125 according to any of the Embodiments 25-27, such as e.g. the sixth embodiments wherein the indication is adapted to be comprised in system information of said message.

34. The UE 125 according to any of the Embodiments 25-33, further being configured to:

initiate random access on the decided one or more UL carriers in the target cell 12.

35. The UE 125 according to Embodiment 34, further being configured to:

when the random access, on the decided one or more UL carriers in the target cell 12 has failed, initiate random access on any one out of:

when the first UL carrier is the decided one or more UL carriers used in the failed random access, initiate random access on the second UL carrier, and when the second UL carrier is the decided one or more UL carriers used in the failed random access, initiate random access on the first UL carrier.

36. Embodiment 36. A first network node 111 e.g. for managing and/or handling Uplink (UL) Transmissions, such as random access transmissions, between a UE 125 and a second network node 112 in a wireless communications network 100, wherein the second network node 112 is adapted to serves a target cell 12 comprising a first UL carrier and a second UL carrier, the first network node 111 being configured to:

e.g. obtain such as decide, one or more UL carriers of the target cell 12 to be used for random access in the target cell 12, which one or more UL carriers corresponds to one or more out of: the first UL carrier and the second UL carrier, and send a message, such as e.g. a Radio Resource Control, RRC, signalling message, to the UE 125, which message relates to a handover of the UE 125 to the target cell 12, and which message is adapted to comprise an indication indicating one or more UL carriers of the target cell 12 to be used for random access in the target cell 12, e.g. such as obtained or decided, wherein the indicated one or more UL carriers are adapted to correspond to one or more out of: the first UL carrier and the second UL carrier.

37. The first network node 111 according to Embodiment 36, wherein the indication is adapted to be indicated according to any one out of: explicitly and implicitly.

38. The first network node 111 according to any of the Embodiments 36-37, wherein the first carrier is adapted to be a New Radio (NR) UL carrier and wherein the second UL carrier is adapted to be a Supplementary UL (SUL) carrier.

39. The first network node 111 according to any of the Embodiments 36-38, such as e.g. the first embodiments wherein the indication is adapted to indicate any one out of: a carrier index and a carrier type, of the one or more UL carriers in the target cell 12.

40. The first network node 111 according to any of the Embodiments 36-38, such as e.g. the second embodiments wherein the indication is adapted to comprise one random access configuration which is applicable to both the first UL carrier and the second UL carrier, and wherein the message further is adapted to comprise an indication of a rule of when to use the random access configuration for the first UL carrier and when to use the random access configuration for the second UL carrier.

41. The first network node 111 according to any of the Embodiments 36-38, such as e.g. the third embodiments, wherein the indication is adapted to comprise two separate random access configurations whereof a first random access configuration is adapted to be applicable to the first UL carrier and a second random access configuration is adapted to applicable to the second UL carrier, and wherein the message further is adapted to comprise an indication of a rule, such as e.g. a priority order, or a threshold, of when to use the first random access configuration for the at least one first UL carrier and when to use the second random access configuration for the second UL carrier.

42. The first network node 111 according to any of the Embodiments 36-38, such as e.g. the fourth embodiments, wherein the indication is adapted to comprise an instruction the UE 125 to initiate two random accesses such as e.g. two RACH accesses, to access the target cell 12, whereof one random access such as e.g. one RACH access, on the first UL carrier, and one random access such as e.g. one RACH access, on the second UL carrier.

43. The first network node 111 according to any of the Embodiments 36-38, such as e.g. the fifth embodiments wherein the message is adapted to be a handover command, and wherein the indication is adapted to comprise that the handover command corresponds to one or more out of the first UL carrier and the second UL carrier.

44. The first network node 111 according to any of the Embodiments 36-38, such as e.g. the sixth embodiments wherein the indication is adapted to be comprised in system information of said message.

Further Extensions and Variations

Figure 7:
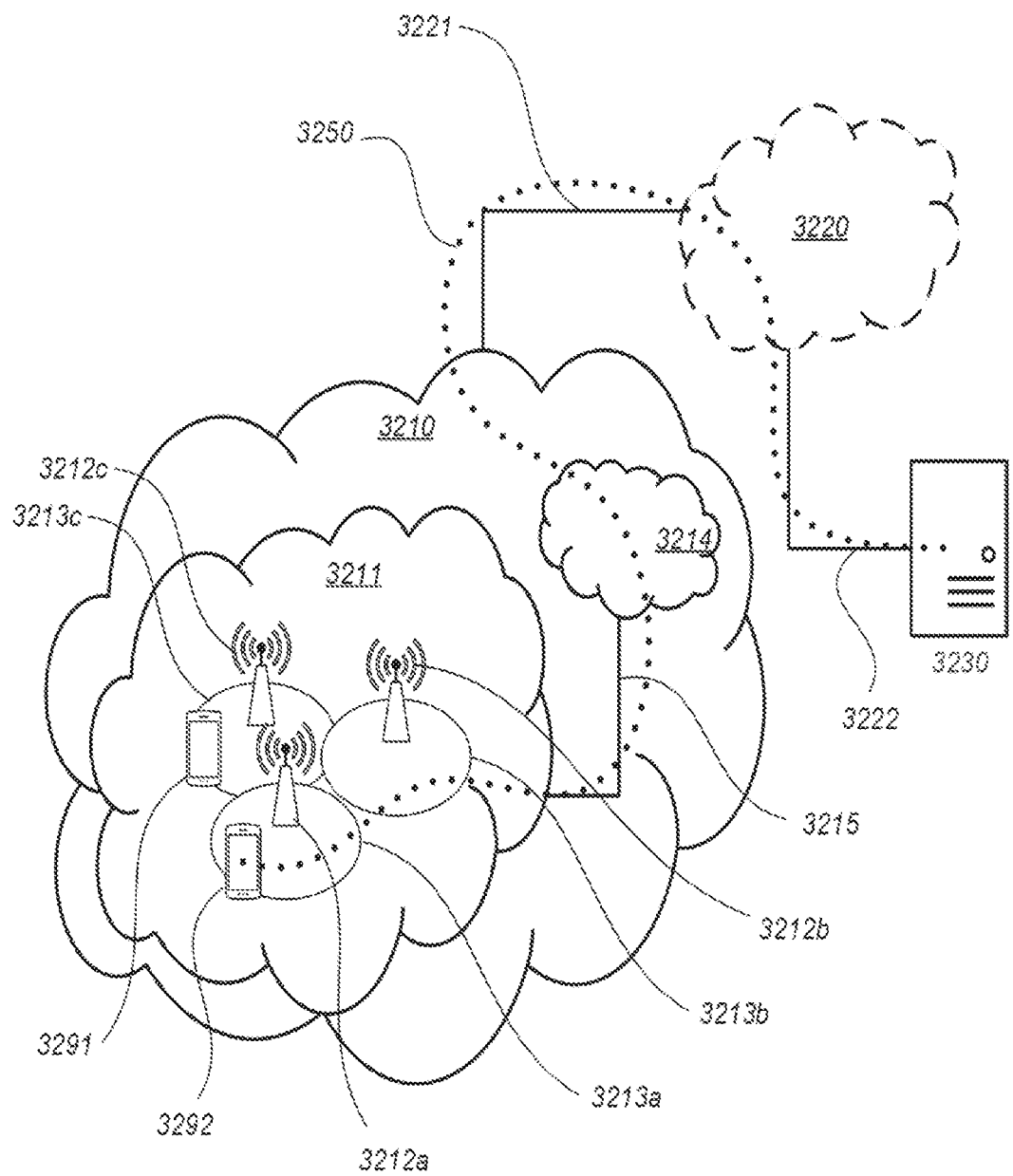
FIG. 7 schematically illustrates a telecommunication network connected via an intermediate network to a host computer.

With reference to FIG. 7, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the first network node 111, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 125 such as a Non-AP STA 3291 located in coverage area 3213c is configured to wirelessly connect to, or be paged by, the corresponding base station 3212c. A second UE 3292 e.g. the UE 125 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

Figure 8:
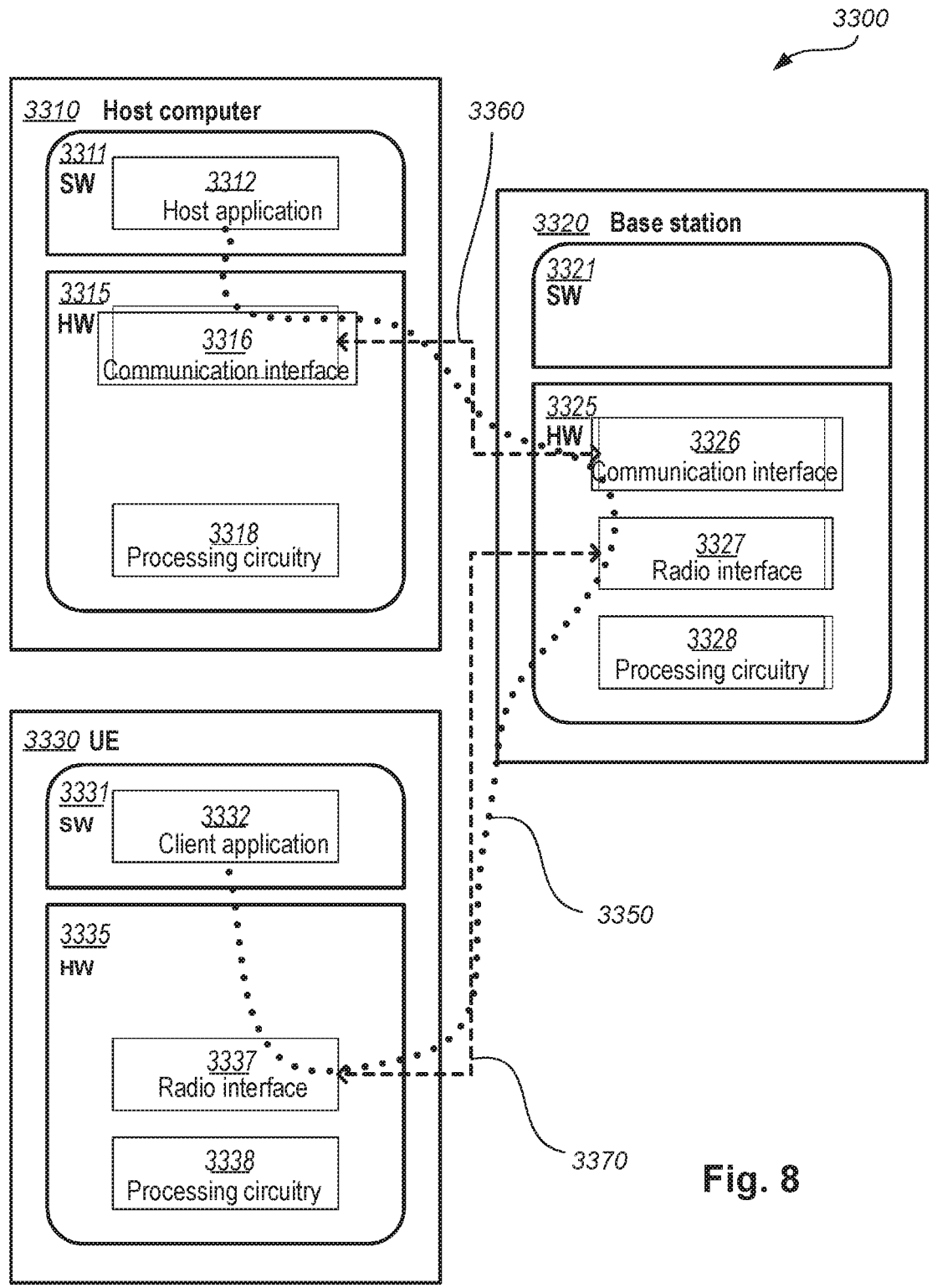
FIG. 8 is a generalized block diagram of a host computer communicating via a base station with a user equipment over a partially wireless connection.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 9 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 10 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 11 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 12 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a User Equipment (UE) for managing Uplink (UL) transmissions between the UE and a second network node in a wireless communications network, wherein the second network node serves a target cell comprising a first UL carrier and a second UL carrier, the method comprising:
receiving, a message from a first network node, wherein the message relates to a handover of the UE to the target cell and the message comprises an indication indicating one or more UL carriers of the target cell, the indication indicating a random access configuration that is applicable to both the first UL carrier and the second UL carrier, and wherein the message further comprises an indication of a rule of when to use the random access configuration for the first UL carrier and when to use the random access configuration for the second UL carrier; and
deciding which one or more out of the first UL carrier and the second UL carrier that is corresponding to the indicated one or more UL carriers, wherein the decided one or more UL carriers are for random access in the target cell.

2. The method of claim 1, wherein the indication indicating one or more UL carriers of the target cell is indicated either explicitly or implicitly.

3. The method of claim 1, wherein the first carrier is a New Radio (NR) UL carrier and wherein the second UL carrier is a Supplementary UL (SUL) carrier.

4. The method of claim 1, wherein the indication indicating one or more UL carriers of the target cell indicates any one out of: a carrier index and a carrier type, of the one or more UL carriers in the target cell.

5. The method of claim 1, wherein the method further comprises initiating random access on the decided one or more UL carriers in the target cell, wherein said initiating is responsive to receiving the message and in accordance with the rule.

6. The method of claim 5, further comprising:
when the random access on the decided one or more UL carriers in the target cell has failed, initiating random access on any one out of:
when the first UL carrier is the decided one or more UL carriers used in the failed random access, initiating random access on the second UL carrier, and
when the second UL carrier is the decided one or more UL carriers used in the failed random access, initiating random access on the first UL carrier.

7. The method of claim 1, wherein the rule specifies a priority order for attempting to access the first UL carrier or the second UL carrier, or the rule specifies how to determine, based on measured signal levels, which of the first UL carrier and the second UL carrier the UE should attempt to access first.

8. A method performed by a first network node for managing Uplink (UL) transmissions, between a user equipment (UE) and a second network node in a wireless communications network, wherein the second network node serves a target cell comprising a first UL carrier and a second UL carrier, the method comprising:
sending a message to the UE, wherein the message relates to a handover of the UE to the target cell and the message comprises an indication indicating one or more UL carriers of the target cell to be used for random access in the target cell, wherein the indicated one or more UL carriers corresponds to one or more out of: the first UL carrier and the second UL carrier;
wherein the indication indicates a random access configuration that is applicable to both the first UL carrier and the second UL carrier, and wherein the message further comprises an indication of a rule of when to use the random access configuration for the first UL carrier and when to use the random access configuration for the second UL carrier.

9. The method of claim 8, wherein the indication indicating one or more UL carriers of the target cell is indicated according to any one out of: explicitly and implicitly.

10. The method of claim 8, wherein the first carrier is a New Radio (NR) UL carrier and wherein the second UL carrier is a Supplementary UL (SUL) carrier.

11. The method of claim 8, wherein the indication indicating one or more UL carriers of the target cell indicates any one out of: a carrier index and a carrier type, of the one or more UL carriers in the target cell.

12. The method of claim 8, wherein the rule specifies a priority order for attempting to access the first UL carrier or the second UL carrier, or the rule specifies how to determine, based on measured signal levels, which of the first UL carrier and the second UL carrier the UE should attempt to access first.

13. A User Equipment (UE) for managing Uplink (UL) transmissions between the UE and a second network node in a wireless communications network, wherein the second network node is adapted to serve a target cell comprising a first UL carrier and a second UL carrier, the UE comprising:
a wireless receiver;
a wireless transmitter; and
a processing circuit operatively coupled to the wireless receiver and wireless transmitter and configured to:
receive a message from a first network node, via the wireless receiver, wherein the message relates to a handover of the UE to the target cell and the message is adapted to comprise an indication indicating one or more UL carriers of the target cell, the indication comprising a random access configuration that is applicable to both the first UL carrier and the second UL carrier, and wherein the message further comprises an indication of a rule of when to use the random access configuration for the first UL carrier and when to use the random access configuration for the second UL carrier, and decide which one or more out of the first UL carrier and the second UL carrier that is corresponding to the indicated one or more UL carriers, which decided one or more UL carriers are adapted to be used for random access in the target cell.

14. The UE of claim 13, wherein the indication indicating one or more UL carriers of the target cell is either explicit or implicit.

15. The UE of claim 13, wherein the first carrier is a New Radio (NR) UL carrier and wherein the second UL carrier is a Supplementary UL (SUL) carrier.

16. The UE of claim 13, wherein the indication indicating one or more UL carriers of the target cell indicates any one out of: a carrier index and a carrier type, of the one or more UL carriers in the target cell.

17. The UE of claim 13, wherein the processing circuit is further configured to:
initiate random access on the decided one or more UL carriers in the target cell, in response to receiving the message and in accordance with the rule.

18. The UE of claim 17, wherein the processing circuit is further configured to:
when the random access, on the decided one or more UL carriers in the target cell has failed, initiate random access on any one out of:
when the first UL carrier is the decided one or more UL carriers used in the failed random access, initiate random access on the second UL carrier, and
when the second UL carrier is the decided one or more UL carriers used in the failed random access, initiate random access on the first UL carrier.

19. The UE of claim 13, wherein the rule specifies a priority order for attempting to access the first UL carrier or the second UL carrier, or the rule specifies how to determine, based on measured signal levels, which of the first UL carrier and the second UL carrier the UE should attempt to access first.

20. A first network node for managing Uplink (UL) transmissions between a UE and a second network node in a wireless communications network, wherein the second network node is adapted to serve a target cell comprising a first UL carrier and a second UL carrier, the first network node comprising:

a wireless receiver;

a wireless transmitter; and a processing circuit operatively coupled to the wireless receiver and wireless transmitter and configured to:

send a message to the UE, wherein the message relates to a handover of the UE to the target cell and the message is adapted to comprise an indication indicating one or more UL carriers of the target cell to be used for random access in the target cell, wherein the indicated one or more UL carriers are adapted to correspond to one or more out of: the first UL carrier and the second UL carrier, wherein the indication comprises a random access configuration that is applicable to both the first UL carrier and the second UL carrier, and wherein the message further comprises an indication of a rule of when to use the random access configuration for the first UL carrier and when to use the random access configuration for the second UL carrier.

21. The first network node of claim 20, wherein the indication indicating one or more UL carriers of the target cell is either explicit or implicit.

22. The first network node of claim 20, wherein the first carrier is a New Radio (NR) UL carrier and wherein the second UL carrier is a Supplementary UL (SUL) carrier.

23. The first network node of claim 20, wherein the indication indicating one or more UL carriers of the target cell is adapted to indicate any one out of: a carrier index and a carrier type, of the one or more UL carriers in the target cell.

24. The first network node of claim 20, wherein the rule specifies a priority order for attempting to access the first UL carrier or the second UL carrier, or the rule specifies how to determine, based on measured signal levels, which of the first UL carrier and the second UL carrier the UE should attempt to access first.

* * * * *

UNITED STATES PATENT AND TRADEMARK OFFICE
CERTIFICATE OF CORRECTION

PATENT NO. : 10,887,813 B2
APPLICATION NO. : 16/235332
DATED : January 5, 2021
INVENTOR(S) : Wang et al.

It is certified that error appears in the above-identified patent and that said Letters Patent is hereby corrected as shown below:

In the Specification

In Column 3, Line 30, delete "according a measured" and insert -- according to a measured --, therefor.

In Column 9, Lines 1-2, delete "Resource Control (RRC)" and insert -- Radio Resource Control (RRC) --, therefor.

In Column 11, Line 30, delete "in this" and insert -- In this --, therefor.

In Column 12, Line 3, delete "Initiating" and insert -- initiating --, therefor.

In Column 12, Line 9, delete "a Initiating" and insert -- an initiating --, therefor.

In Column 12, Line 22, delete "Input and output Interface" and insert -- input and output interface --, therefor.

In Column 13, Lines 44-45, delete "Input and output Interface" and insert -- input and output interface --, therefor.

In Column 15, Line 53, delete "Embodiment 10," and insert -- Embodiment 12, --, therefor.

In Column 16, Line 67, delete "Embodiment 25," and insert -- Embodiment 23, --, therefor.

In Column 18, Line 65, delete "to applicable" and insert -- to be applicable --, therefor.

In Column 21, Line 35, delete "use equipment" and insert -- user equipment --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*